(12) United States Patent
Habermann

(10) Patent No.: US 7,344,242 B2
(45) Date of Patent: Mar. 18, 2008

(54) EYEGLASSES

(75) Inventor: Gert Habermann, Munich (DE)

(73) Assignee: IC! Berlin Brillenproduktions GmbH (DE)

( * ) Notice: Subject to any disclaimer, the term of this patent is extended or adjusted under 35 U.S.C. 154(b) by 34 days.

(21) Appl. No.: 11/125,793

(22) Filed: May 10, 2005

(65) Prior Publication Data

US 2005/0259218 A1    Nov. 24, 2005

(30) Foreign Application Priority Data

May 13, 2004    (DE)    ...................... 10 2004 023 839

(51) Int. Cl.
*G02C 5/22*    (2006.01)
(52) U.S. Cl. ........................ 351/156; 16/228
(58) Field of Classification Search ................ 351/153, 351/140, 111, 113, 114, 41, 158; 16/228
See application file for complete search history.

(56) References Cited

U.S. PATENT DOCUMENTS 3,155,982 A    11/1964    Baratelli 4,978,209 A * 12/1990 Ohba ........................ 351/153
5,847,801 A * 12/1998 Masunaga ................... 351/153

FOREIGN PATENT DOCUMENTS

| DE | 1 686 969 | 10/1954 |
| DE | 89 02 196.7 | 2/1989 |
| EP | 0 863 424 B1 | 1/1998 |
| WO | WO 98/48314 | 4/1998 |

* cited by examiner

*Primary Examiner*—Hung X. Dang
(74) *Attorney, Agent, or Firm*—St. Onge Steward Johnston & Reens LLC

(57) ABSTRACT

The present invention relates to an eyeglasses with one arm on the left and on the right side and with on each side one connector element of a mount, where on the connector element joint elements are positioned which work together with joint elements positioned on the end of the arm close to the mount, forming a rotary joint. The arm has on its end close to the mount at least two fingers in its longitudinal direction, which exert a spring action in the direction of the joint axis of the rotary joint.

16 Claims, 4 Drawing Sheets

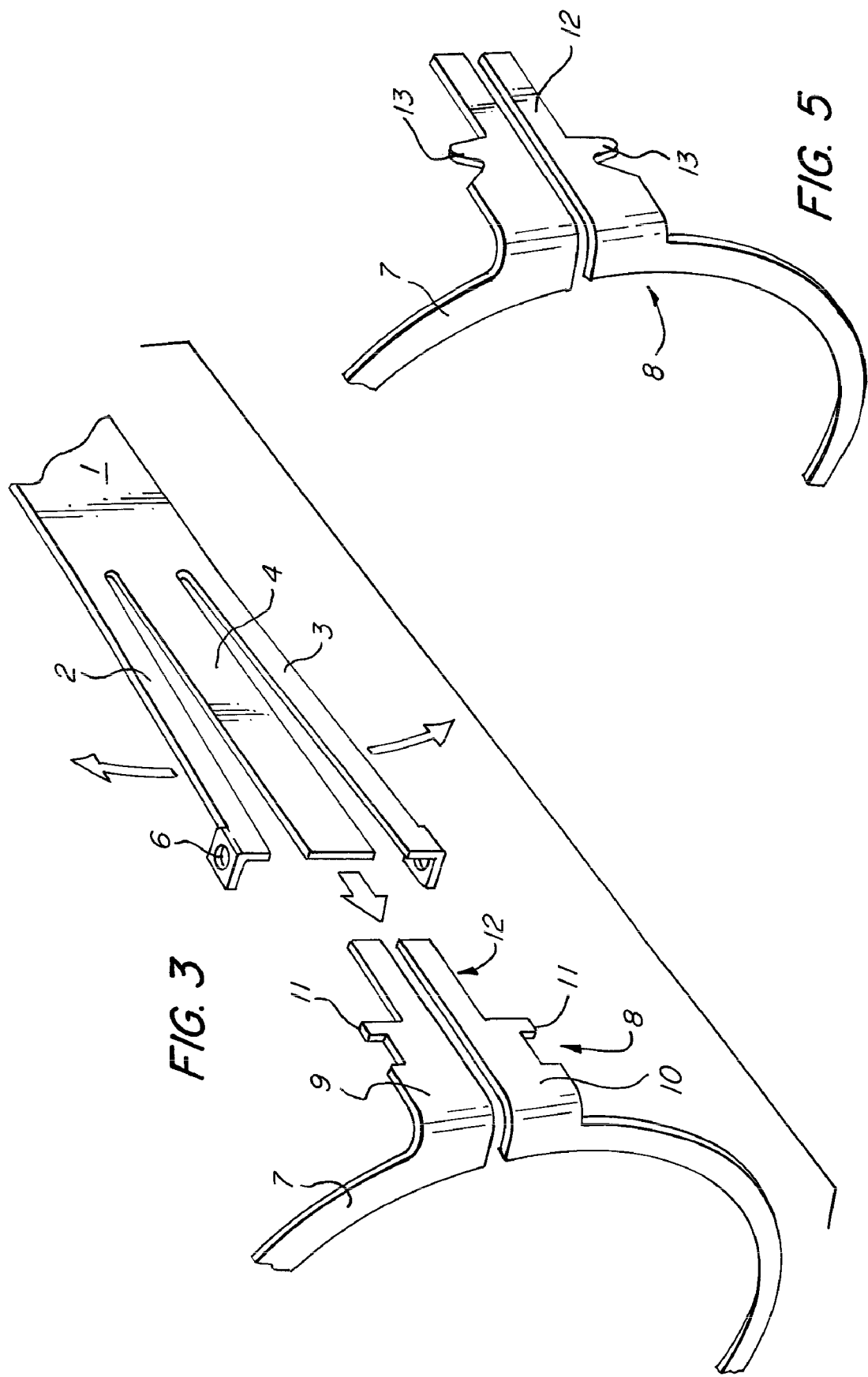

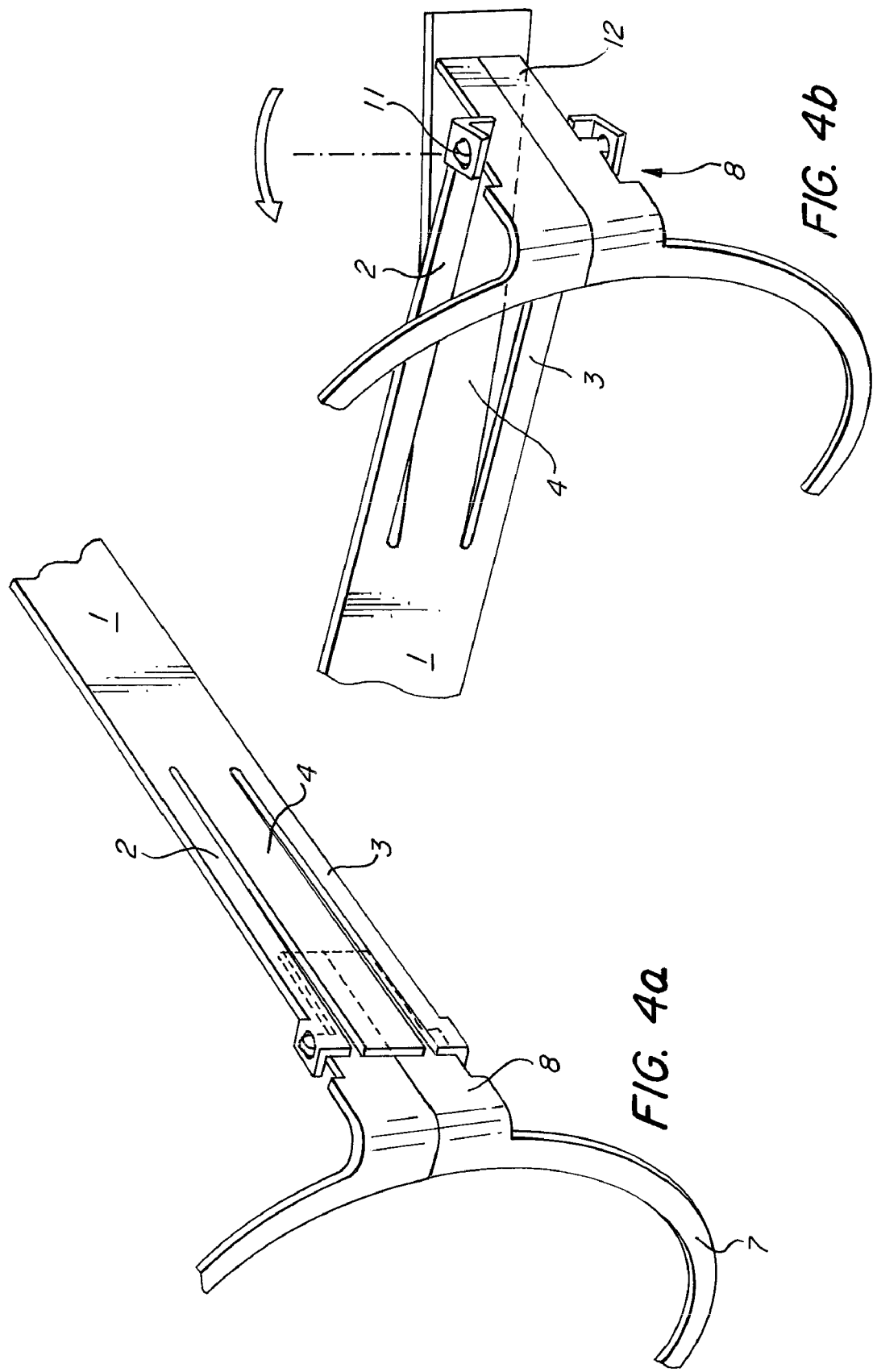

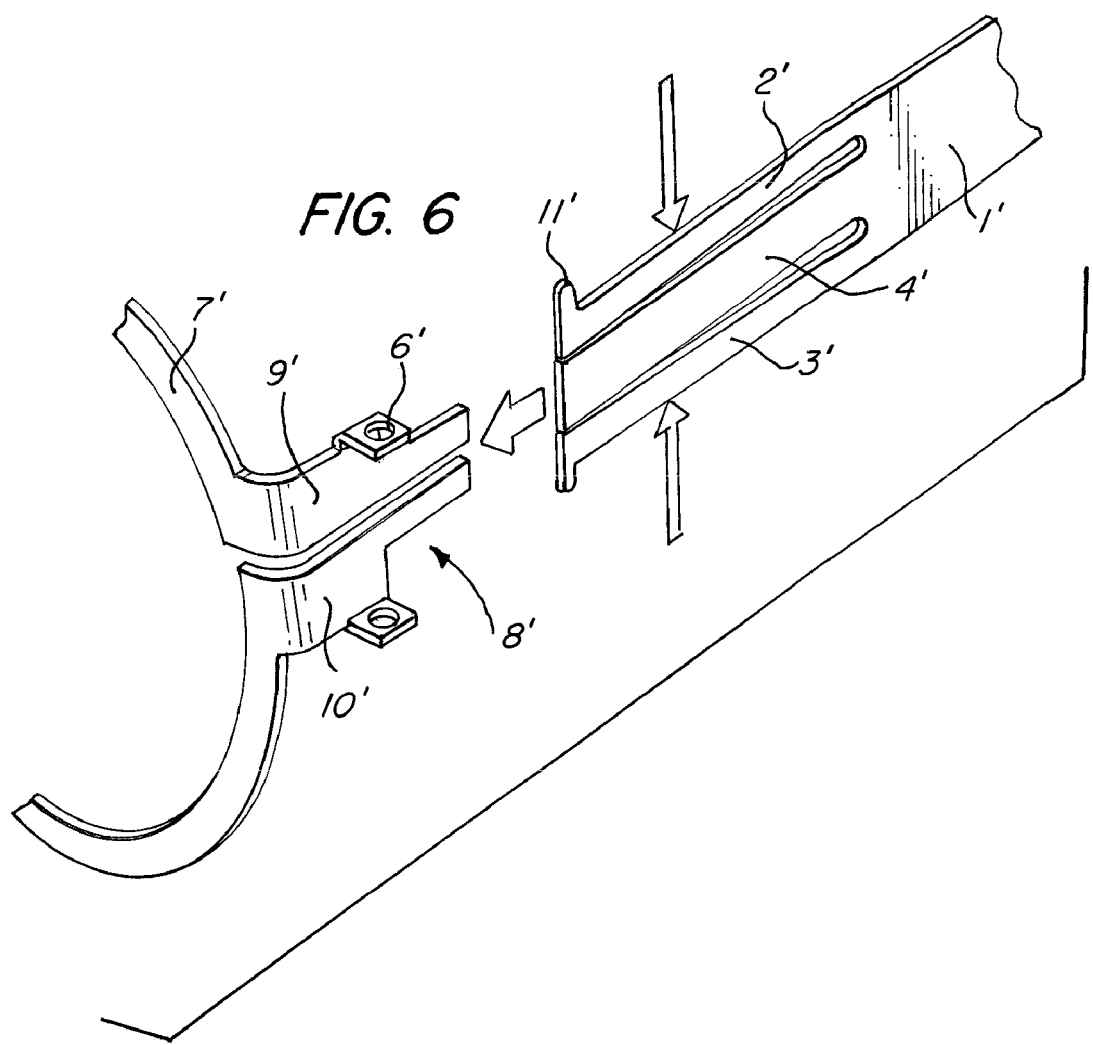

EYEGLASSES

This application claims priority of German Patent Application No. 10 2004 023 839.1 filed on May 13, 2004.

BACKGROUND OF THE INVENTION

The invention relates to a set of eyeglasses or a glasses frame that dispenses with screws in its jointed mechanism.

The current state of the art includes a range of variants of jointed mechanisms in eyeglasses frames. The most common variant is based on a hinge mechanism in which rods are mounted on the frame or mount of the glasses lenses, which rods work jointly with a corresponding joint portion, which is positioned on the end of the arm close to the mount, so that the two portions are pushed together and are rotatably connected by means of special screws. With most glasses mounts, especially those that are to be used with corrective lenses, the mounts are opened and closed to insert or replace the glasses lenses by means of a so-called locking block. It is also possible that the lenses are secured immediately onto a frame by having screws bolted directly into the lens. In frameless glasses the arms are bolted directly with lenses by means of an extender piece.

Because the rotary joint receives dynamically heavy use during the lifetime of the glasses, several solutions have dispensed with a rotary joint for the sake of simplicity.

Thus, U.S. Pat. No. 3,155,982 proposes a set of glasses in which the glasses arm works directly with the front portion of the mount which contains the lenses. For this purpose the end of the end of the arm on the mount side is divided into three leaf springs in such a way that the center leaf spring contacts the outer edge of the mount part, while the two external leaf springs engage with apertures by means of hooks formed on their ends. These apertures are positioned in the main portion in the proximity of the outer edge. One disadvantage of the joint construction described in U.S. Pat. No. 3,155,982 consists in the fact that the glasses arm is connected only very loosely with the mount, so that it can easily occur that the glasses arms are released from the mount, for instance when the glasses fall on the ground.

Another glasses joint solution, which also works with a glasses arm equipped with three leaf springs, is proposed by Haffmans and Gottschling in European Patent No. 0 863 424 131. A connector element is provided on each side to the right and left of the mount, and has upper and lower accesses that form a joint axis running perpendicular to the direction of the unfolded arm. When the arm is in unfolded position, the two external leaf springs of the arm grip through the recesses in the connector element from the surface of the connector element turned toward the face of the person wearing the glasses outward with curvatures provided on their free ends and then come in contact with the surface of the connector element turned away from the wearer's face, while the center leaf sprig is in contact with the opposite surface of the connector element over its entire length. The connector element is thus divided in two, making it easy to replace the lenses. For stability, a closing clamp can be used. This mechanism has the disadvantage, however, that the arms can be difficult to install because the external leaf springs and the center leaf spring must be moved past one another on surfaces of the connector element opposite to one another so that it is necessary to work against the spring action and the curvatures of the ends prove a hindrance. In addition, especially in small-dimensioned versions of this joint, there is the danger that the arm can come loose from the connector element even from slight mechanical pressure.

A joint mechanism is described in WO 98/148313 in which two fingers, one mounted on each of the joint-side ends of the glasses arm, are arched away from one another and the curved ends engage rotatably in apertures which are arranged on a connecting element on the frame side. The curved ends of the fingers are held secure in these apertures in that these fingers exert a certain spring action upward and downward. Such a joint mechanism, however, is not associated with flat metal glasses like those for instance in EP 0 863 424 B1.

On this basis, it is the object of the present invention to produce a glasses frame that allows easy installation of the arms and in which it becomes difficult for the glasses arms to come loose independently from mechanical pressure on the glasses, in particular with flat metal glasses.

This object is fulfilled through a glasses frame with the characteristics of Patent Claim 1.

Advantageous embodiments of the invention can be seen n the subsidiary claims.

Consequently the crux of the invention consists in the fact that the arms of the glasses frame on their ends toward the mount side have at least two fingers in their longitudinal direction that are configured so that they exert a spring effect essentially in the direction of the joint axis of a rotary joint formed by joint elements of the connector element of the mount and by cooperating joint elements of the glasses arm, and these fingers hold the joint elements of the arms and of the connector element in a rotatable and secure connection, and that these fingers at the same time are configured as leaf springs whose leaf surface, when the arm is unfolded, runs essentially in the plane of the connector element belonging to the arm, which connector element is also nearly leaf-shaped.

In one embodiment of the glasses frame, the fingers are configured so that the spring force exerted by at least one finger works in the direction onto the other finger.

Such a construction is used especially in an advantageous design of the glasses frame in which the connector element is divided throughout its length into an upper brace and a lower brace. The division of the connector element extends through the mount all the way to the glasses lenses. This makes replacement of the glasses lenses easy because with the arms removed the sides of the mount can easily be arched apart making the lenses accessible.

With the arms mounted, the spring force of the fingers, finally, makes it possible for the braces to be tensed against one another and the glasses lenses are fixed securely in the corresponding section of the mount.

In this design the arms have joint elements on the fingers in the shape of loops, while corresponding pivot studs are provided on the connector elements. With the arm mounted, consequently, the pivot studs of the connector element grip in the loops of the fingers, so that the spring effect of the fingers holds the loops constantly rotatable on the pivot studs.

In another embodiment the pivot studs of the connector element are so configured that they are rotatably inserted in corresponding concave bearing bushes of the fingers, which bushes are situated opposite to one another, and also in this case the spring action of the fingers is secured, so that the bearing bushes are constantly held in a rotatable contact by means of the pivot stud of the connector element.

In a simple manner the fingers can be drawn apart contrary to their spring action in order to release the arms from the connector element and to make the mount accessible for replacement of glasses lenses.

In another embodiment of the glasses frame, the fingers are constructed in such manner that the spring force exerted by at least one finger acts in reverse direction, that is in the direction away from the other finger.

In corresponding manner, then, loops are provided on the connector element into which pivot studs engage which protrude upward and downward from the fingers. The spring action prevents any release of the pivot stud from the loops while forming a simple rotary joint. To dismantle the arms it is sufficient simply to press the fingers of the arm together against their spring power.

In addition to the fingers configured as leaf springs, in another embodiment a third, central leaf spring is provided between these two, with all leaf springs running parallel to one another.

While the outermost of the three leaf springs form the joint elements—depending on the embodiment the loops or the pivot studs—the center leaf spring serves to form a reverse spring mechanism, which supports the unfolding or folding of the arm.

For this purpose the center leaf spring supports itself on a section of the connector element which extends in the direction toward the arm and thus forms an abutment.

According to the invention it is thus ensured that the length of the leaf spring and the length of the abutment are selected in such a way that the spring action on the one hand is sufficient to achieve a secure connection of the joint elements of the arm and connector element and on the other hand the leaf spring action of the center leaf spring of the arm is sufficient to hold the arm in an unfolded position. In addition, in the embodiment with two braces of the connector element, the lengths of the respective components are selected in such a way that in addition the spring action is sufficient to achieve the secure joining of both braces of the connector element.

If the leaf-shaped abutment in one embodiment of the glasses frame extends from the joint elements of the connector element in the direction toward the arm, it is thus configured so that the outer leaf springs can run outward over the abutment during folding.

To achieve additional stability, according to the invention it is also possible to provide a collar which can be slid up before the arm is moved forward by means of the connector element belonging to the arm and thus secures the braces together rigid against bending.

All components of the inventive glasses frame can be produced in a preferred embodiment as punching parts or sectional parts made of sheet metal, which are then bent into the desired enclosing shape. It is also possible to employ titanium as a material for the individual elements.

The invention will now be more closely described with reference to the embodiments shown in the adjacent illustrations.

BRIEF DESCRIPTION OF THE DRAWINGS

FIG. 3 shows a perspective explosion view of half of a glasses frame according to the invention.

FIG. 4a shows a schematic view of an arm and a mount of the inventive glasses frame with the arm in unfolded position;

FIG. 4b shows a schematic view of the arm and the mount of the inventive glasses frame with the arm in folded position; and FIG. 5 shows a connector element with alternative joint elements.

FIG. 6 shows a perspective explosion view of half of a glasses frame according to another embodiment of the invention.

DETAILED DESCRIPTION OF THE DRAWINGS

Figure 1:
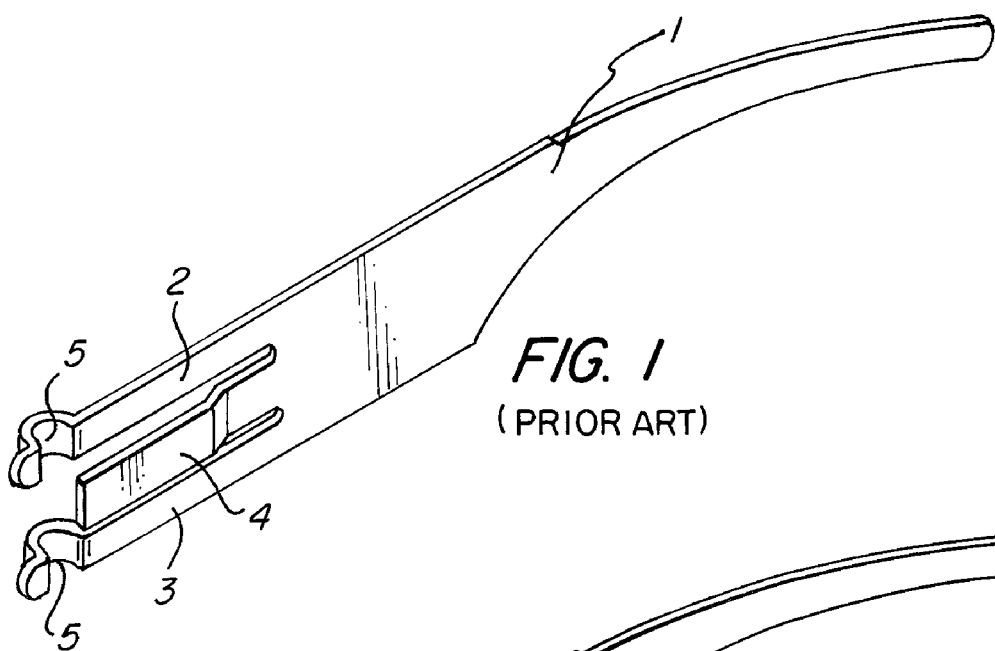
FIG. 1 shows a perspective view of an arm for a glasses frame according to the state of the art.

In FIG. 1, in exemplary fashion, an arm 1 according to the state of the art is shown such as the one described in EP 0 863 424 B1. The arm 1 is divided into three leaf springs 2, 3, and 4, into two outer leaf springs 2 and 3, and into a center leaf spring 4. The outer leaf springs 2 and 3 have on their ends curvatures 5, which engage in corresponding recesses (not further illustrated here) of a connector element of a mount. As previously mentioned, here the center leaf spring 4 and the outer leaf springs 2 and 3 lie on opposite sides of the connector element of the glasses frame, which prevents easy mounting of the arm.

Figure 2A:
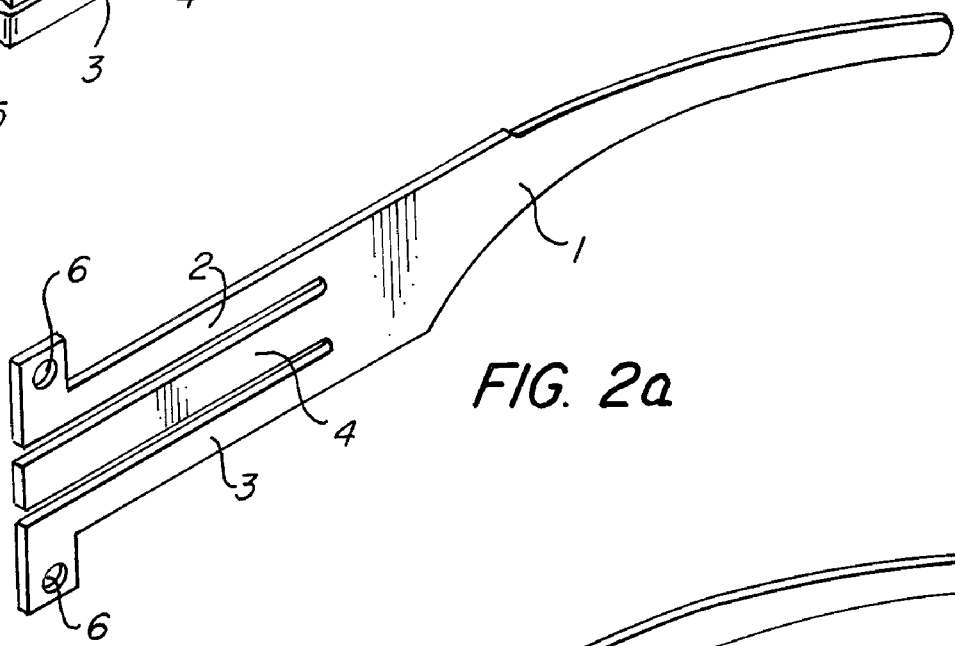
FIG. 2a shows a perspective view of an non-shaped arm for a glasses frame according to the invention, with loops shaped to fit.
Figure 2B:
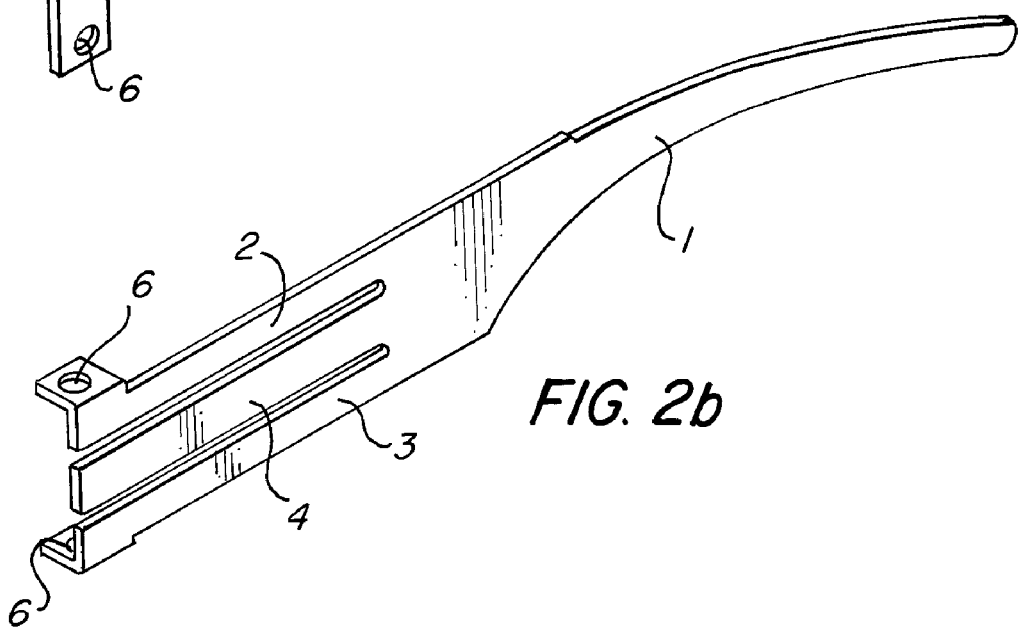
FIG. 2b shows a perspective view of the shaped arm for a glasses frame according to the invention with angled loops.

FIGS. 2a and 2b are schematic depictions of an arm 1 for a glasses frame according to the invention.

The arm 1 also has two outer leaf springs 2 and 3 as well as a center leaf spring 4. The outer leaf springs 2 and 3 each have a loop 6 on their ends.

FIG. 2a shows in this connection the shape of the arm 1 as a punched sheet metal part, while in FIG. 2b the loops 6 are arched athwart the longitudinal direction of the arm 1 in order to define the axis of a rotary joint.

The glasses arm illustrated in FIG. 2b, in comparison to the glasses arm shown in FIG. 1, has longer slits to divide the leaf springs in order to make it easier to pull apart the two outer leaf springs athwart the longitudinal direction of the arm, as more closely explained below.

FIG. 3 shows the arm separated from a mount 7.

The mount 7 on both sides has a connector element 8, which in comparison to the length of the arm is relatively short, extends in the direction toward the arm 1, and is divided into an upper brace 9 and a lower brace 10.

As can be seen in FIG. 3, the division of the connector element extends into the front part of the mount 7 as far as the glasses lenses that are not illustrated here. If the arm 1 is removed, the mount 7 can be easily opened laterally in that the braces 9 and 10 are arched away from one another in order to insert or replace the glasses lenses.

On the braces 9 and 10 of the connector element 8, pivot studs 11 are positioned, overlapping one another while forming a rotation axis, which studs engage in the loops 6 of the outer leaf springs 2 and 3 of the arm 1 in the installed position, as is shown in FIGS. 4a and 4b, and thus form a simple rotary joint.

As can be seen from FIG. 3, the arm 1 in simple manner is secured on the connector element 8 by having the outer leaf springs 2 and 3 pulled apart and slid over the pivot stud 11. The spring action of the outer leaf springs 2 and 3 toward one another causes the loops 6 to snap securely yet rotatably over the pivot stud 11, in addition causing the upper brace 9 and the lower brace 10 to be secured together rigidly against bending.

The connector element 8 has a leaf-shaped abutment, which extends from the pivot stud 11 in the direction toward the arm 1.

As can be seen in FIG. 4a, the center leaf spring 4, in unfolded position, comes into contact with the surface of the abutment 12 turned away from the glasses wearer. Upon folding, as shown in FIG. 4b, the center leaf spring 4 is supported on the abutment 12 in order to form a reverse spring mechanism. The abutment 12 is shaped here in such a way that the outer leaf springs 2 and 3 can run unimpeded over the abutment 12 when the arm 1 is folded.

In FIG. 5, in schematic form, is shown an alternative embodiment of the connector element 8. It shows sphere-like pivot studs 13, which can be received rotatably in bearing bushes (not more closely illustrated here) of the outer leaf springs.

In FIG. 6, in schematic form, is shown an alternative embodiment similar to FIG. 3. Fingers 2', 3' are constructed in such manner that the spring force exerted by at least one finger acts in reverse direction, that is in the direction away from the other finger. In corresponding manner, then, loops 6' are provided on the connector element 8' into which pivot studs 11' engage which protrude upward and downward from the fingers 2', 3'. The spring action prevents any release of the pivot stud from the loops while forming a simple rotary joint. To dismantle the arms it is sufficient simply to press the fingers of the arm together against their spring power.

What is claimed is:

1. A glasses frame with one arm on the right and on the left sides and with a mount, which has one connector element each on the left and right, the end of which close to the arm points, when unfolded, in the direction of the arm, so that on the connector element there are joint elements positioned, which work with joint elements positioned on the end of the arm toward the mount, forming a rotary joint, and so that the arm on its end toward the mount has at least two fingers in its longitudinal direction, which are so configured that they exert spring action essentially in the direction of the joint axis of the rotary joint, which spring action holds the joint elements of the arm and of the connector element in a rotatable and secure connection, characterized in that the fingers of the arm comprise leaf springs whose leaf surface, when the arm is unfolded, runs essentially in the plane of the connector element belonging to the arm; wherein the fingers form three leaf springs.

2. A glasses frame according to claim 1, wherein the spring action consists in the fact that the spring action exerted by one finger acts in the direction toward the other finger.

3. A glasses frame according to claim 2, wherein the connector element is continuously divided into an upper brace and a lower brace.

4. A glasses frame according to claim 3, wherein the division of the connector element extends through the mount as far as the glasses lenses received by the mount.

5. A glasses frame according to claim 1, wherein the joint elements of the arm are loops mounted on the fingers and the joint elements of the connector element are pivot studs which engage in the loops.

6. A glasses frame according to claim 1, wherein the joint elements of the arm are bearing bushes attached to the fingers and the joint elements of the connector element are pivot studs, which are mounted in the bearing bushes.

7. A glasses frame according to claim 1, wherein the spring effect consists in the fact that the spring force exerted by one finger acts in the direction moving away from the other finger.

8. An eyeglasses frame according to claim 7, wherein the joint elements of the connector element are loops and the joint elements of the arm are pivot studs applied on the fingers of the arm which engage in the loops.

9. A glasses frame according to claim 1, wherein the connector element is configured in such a way that it forms an abutment for the center of the three leaf springs of an arm belonging to the connector element when the arm is folded up.

10. A glasses frame according to claim 9, wherein the length of the leaf springs of the arm and the length of the abutment are selected so that the spring effect is sufficient to achieve a secure connection of the joint elements of the arm and of the connector element and in addition the leaf spring effect of the center leaf spring of the arm is sufficient to keep the arm in its folded position.

11. A glasses frame according to claim 10, wherein the length of the leaf springs of the arm and the length of the abutment are selected so that the spring action is sufficient to achieve the holding together of the two braces of the connector element and in addition the leaf spring effect of the center leaf spring of the arm is sufficient to keep the arm in its folded position.

12. A glasses frame according to claim 11, wherein the abutment is configured in the shape of a leaf.

13. A glasses frame according to claim 12, wherein the abutment extends from the joint elements of the connector element in the direction toward the arm in unfolded position in such a way that upon folding of the arm the outer leaf springs of the arm extend outward over the abutment.

14. A glasses frame according to claim 13, wherein a collar is provided, which before installation of the arm can be slid up over the connector element belonging to the arm.

15. A glasses frame according to claim 14, wherein all parts are produced from sheet metal and/or titanium.

16. A glasses frame with one arm on the right and on the left sides and with a mount, which has one connector element each on the left and right, the end of which close to the arm points, when unfolded, in the direction of the arm, so that on the connector element there are joint elements positioned, which work with joint elements positioned on the end of the arm toward the mount, forming a rotary joint, and so that the arm on its end toward the mount has at least two fingers in its longitudinal direction, which are so configured that they exert spring action essentially in the direction of the joint axis of the rotary joint, which spring action holds the joint elements of the arm and of the connector element in a rotatable and secure connection, characterized in that the fingers of the arm comprise a surface in the longitudinal direction of the arm, when the arm is unfolded, that runs essentially in the plane of the connector element belonging to the arm; wherein the arm forms a leaf spring at the end of the arm toward the mount that has a leaf surface that runs essentially in the plane of the connector element belonging to the arm when the arm is unfolded and that exerts a force in a direction perpendicular to the leaf surface against the connector element.

* * * * *